US012791778B2

(12) United States Patent
Imai et al.

(10) Patent No.: US 12,791,778 B2
(45) Date of Patent: Nov. 10, 2026

(54) LIGHT GUIDING PLATE, IMAGE DISPLAY APPARATUS, AND METHOD FOR MANUFACTURING LIGHT GUIDING PLATE

(71) Applicant: SONY SEMICONDUCTOR SOLUTIONS CORPORATION, Kanagawa (JP)

(72) Inventors: Satoshi Imai, Tokyo (JP); Kazuma Aiki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 283 days.

(21) Appl. No.: 18/686,800

(22) PCT Filed: Mar. 7, 2022

(86) PCT No.: PCT/JP2022/009627
§ 371 (c)(1),
(2) Date: Feb. 26, 2024

(87) PCT Pub. No.: WO2023/032271
PCT Pub. Date: Mar. 9, 2023

(65) Prior Publication Data

US 2024/0353605 A1 Oct. 24, 2024

(30) Foreign Application Priority Data

Sep. 6, 2021 (JP) ................................ 2021-144486

(51) Int. Cl.
*F21V 8/00* (2006.01)

(52) U.S. Cl.
CPC ......... *G02B 6/0035* (2013.01); *G02B 6/0065* (2013.01)

(58) Field of Classification Search
None
See application file for complete search history.

(56) References Cited

U.S. PATENT DOCUMENTS

| | | | | |
|---|---|---|---|---|
| 11,099,412 | B2 * | 8/2021 | Geng | G02B 5/3025 |
| 11,385,394 | B2 * | 7/2022 | Yao | G02B 6/0073 |

(Continued)

FOREIGN PATENT DOCUMENTS

| | | |
|---|---|---|
| JP | 2011-053367 | 3/2011 |
| JP | 2018-109738 | 7/2018 |

(Continued)

OTHER PUBLICATIONS

English Translation of International Search Report prepared by the Japan Patent Office on May 10, 2022, for International Application No. PCT/JP2022/009627, 2 pgs.

*Primary Examiner* — Jerry Rahll
(74) *Attorney, Agent, or Firm* — SHERIDAN ROSS P.C.

(57) ABSTRACT

A light guiding plate is provided that includes a transparent member; a plurality of reflectors inside of the transparent member; and a projection optical system. The transparent member includes a light entering portion; a first surface on a side of a viewer; and a second surface that faces the first surface and that is a surface at which the video light entering the transparent member is reflected The projection optical system causes video light reflected at the second surface to be reflected onto a corresponding one of the plurality of reflectors. The reflectors are arranged side by side in a direction in which the video light enters the transparent member. Each of the reflectors is inclined at a specified angle with respect to the first surface, and an area of the reflector and/or spacing between the reflectors is changed according to a distance from the projection optical system.

18 Claims, 9 Drawing Sheets

(56) References Cited

U.S. PATENT DOCUMENTS

| | | | | |
|---|---|---|---|---|
| 11,841,526 | B2 * | 12/2023 | Sharlin | G02B 6/0055 |
| 12,013,538 | B2 * | 6/2024 | Connor | G02B 27/0172 |
| 2015/0205126 | A1 * | 7/2015 | Schowengerdt | G06T 15/00 345/633 |
| 2018/0180892 | A1 | 6/2018 | Yoshida | |
| 2018/0210202 | A1 * | 7/2018 | Danziger | G02B 5/30 |
| 2020/0201049 | A1 * | 6/2020 | Ukai | G02B 27/0172 |
| 2020/0233217 | A1 | 7/2020 | Kuno et al. | |
| 2020/0371280 | A1 | 11/2020 | Geng et al. | |
| 2020/0371387 | A1 | 11/2020 | Gollier et al. | |
| 2020/0371388 | A1 | 11/2020 | Geng et al. | |
| 2020/0371389 | A1 | 11/2020 | Geng et al. | |
| 2021/0096373 | A1 | 4/2021 | Lien | |
| 2021/0364833 | A1 | 11/2021 | Geng et al. | |

FOREIGN PATENT DOCUMENTS

| | | | |
|---|---|---|---|
| JP | 2019535024 | A | 12/2019 |
| JP | 2020-118840 | | 8/2020 |
| WO | WO 2017/033975 | | 3/2017 |
| WO | WO 2020/236862 | | 11/2020 |

* cited by examiner

LIGHT GUIDING PLATE, IMAGE DISPLAY APPARATUS, AND METHOD FOR MANUFACTURING LIGHT GUIDING PLATE

CROSS REFERENCE TO RELATED APPLICATIONS

This application is a national stage application under 35 U.S.C. 371 and claims the benefit of PCT Application No. PCT/JP2022/009627, having an international filing date of 7 Mar. 2022, which designated the United States, which PCT application claimed the benefit of Japanese Patent Application No. 2021-144486, filed 6 Sep. 2021, the entire disclosures of each of which are incorporated herein by reference.

TECHNICAL FIELD

The present technology relates to a light guiding plate, an image display apparatus, and a method for manufacturing the light guiding plate.

BACKGROUND ART

Conventionally, an image display apparatus that enables experience of augmented reality (AR) with which an image is displayed by being superimposed on a real world in a field of view of a viewer is known.

For example, Patent Literature 1 discloses "a spectacles-type image display device, comprising: an image output unit including a display element that displays a two-dimensional image and is disposed on a frame of spectacles; and a reflection unit that is disposed adjacent to at least one of spectacle lenses and is configured, when a viewer wears the spectacles, to reflect image light that is output from the image output unit toward an eyeball of the viewer so that the viewer can see a virtual image of the two-dimensional image, wherein the reflection unit is a reflection member having a positive refractive power, and an effective luminous flux that is output from the image output unit and reaches the eyeball of the viewer is configured so that a width of the effective luminous flux perpendicular to an optical axis is the smallest at the reflection unit with respect to an optical axis cross-section parallel to an incident surface of the optical axis on the reflection unit".

For example, Patent Literature 2 discloses "a light guide plate for propagating and projecting incoming image light, comprising: an incident surface which image light enters; first and second internal reflective surfaces that are approximately parallel to each other and propagate incoming image light while totally reflecting the incoming image light; a partially reflective surface array that is placed in an interior sandwiched between the first and second internal reflective surfaces, and has a plurality of partially reflective surfaces arranged therein in a direction of propagating image light, the plurality of partially reflective surfaces being inclined at a predetermined angle, the plurality of partially reflective surfaces partially reflecting the image light; and a uniforming element that uniforms intensity distribution of image light which is reflected by the partially reflective surface array to be projected from the light guide plate".

CITATION LIST

Patent Literature

Patent Literature 1: Japanese Patent Application Laid-open No. 2011-53367

Patent Literature 2: Japanese Patent Application Laid-open No. 2020-118840

DISCLOSURE OF INVENTION

Technical Problem

Patent Literature 1 discloses that it is possible to prevent the field of vision from being obstructed since the reflection unit has a very small area. However, when the area of the reflection unit is made very small, brightness unevenness may be more likely to occur in a displayed image when the diameter of a pupil of a viewer is changed due to the environment around the viewer or the brightness of the displayed image.

Patent Literature 2 discloses that incoming image light is totally internally reflected within the light guide plate to propagate through the light guide plate. However, the image light is affected by the reflective surface every time the image light undergoes total internal reflection. Thus, there is a need to manufacture the reflective surface with a high degree of accuracy. This results in an increase in manufacturing costs.

Thus, it is a primary object of the present technology to provide a light guiding plate, an image display apparatus, and a method for manufacturing the light guiding plate that reduce manufacturing costs while reducing brightness unevenness in a displayed image.

Solution to Problem

The present technology provides a light guiding plate that includes a transparent member that is formed of a transparent material; a plurality of reflectors arranged inside of the transparent member, each of the plurality of reflectors projecting video light onto an eye of a viewer; and a projection optical system, the transparent member including a light entering portion from which the video light enters the transparent member; a first surface that is arranged on a side of the viewer; and a second surface that faces the first surface, the second surface being a surface at which the video light entering the transparent member from the light entering portion is reflected, the projection optical system causing each piece of video light reflected at the second surface to be reflected onto a corresponding one of the plurality of reflectors, the reflectors of the plurality of reflectors being arranged side by side in a direction in which the video light enters the transparent member, each of the plurality of reflectors being inclined at a specified angle with respect to the first surface, in which an area of the reflector and/or spacing between the reflectors is changed according to a distance from the projection optical system; the area is larger at a larger distance from the projection optical system; and the spacing is smaller at a larger distance from the projection optical system.

The reflectors of the plurality of reflectors may be inclined at substantially the same angle with respect to the first surface.

The reflectors of the plurality of reflectors may have substantially the same optical characteristics.

The reflector may include a thin metallic film or a dielectric multilayer.

The reflector may be arranged at a position dependent on an angle of view for the video light.

The reflector may have a width greater than or equal to 0.7 mm in an up-and-down direction as viewed from the viewer.

One of surfaces of the reflector may exhibit a lower reflectance than another of the surfaces.

The reflector may include a gaseous layer.

The projection optical system may include a concave reflective film.

The video light may be totally internally reflected only once at the second surface within the transparent member.

The transparent member may include plastic.

The transparent member may include at least two members that face each other, and the reflector may be arranged between the facing members.

The transparent member may include a first member and a second member that face each other; the first member may include a first engagement portion that faces the first surface, the first engagement portion including a plurality of convex portions to be formed into a saw-tooth-roof shape; the second member may include a second engagement portion that faces the second surface, the second engagement portion being engaged with the first engagement portion; and the reflector may be provided to the first engagement portion or the second engagement portion.

A convex portion included in a plurality of the convex portions and situated at a larger distance from the projection optical system may have a smaller apex angle, the plurality of convex portions being included in each of the first engagement portion and the second engagement portion.

The light guiding plate may further include a convex lens, and the convex lens may be arranged on an optical axis corresponding to the video light entering the transparent member from the light entering portion.

Further, the present technology provides an image display apparatus that includes a video display section that projects video light; and the light guiding plate.

The video display section may include a self-luminous element.

Furthermore, the present technology provides a method for manufacturing a light guiding plate, the method including forming, into a saw-tooth-roof shape, at least one of surfaces of a transparent member formed of a transparent material, the saw-tooth-roof shape including a plurality of convex portions; forming a reflector on the saw-tooth-roof-shaped surface; and bonding at least the two transparent members such that the saw-tooth-roof-shaped surfaces of the at least the two transparent members face each other, in which a convex portion of the plurality of convex portions that is situated at a larger distance from one side of the light guiding plate has a smaller apex angle.

The present technology makes it possible to provide a light guiding plate, an image display apparatus, and a method for manufacturing the light guiding plate that reduce manufacturing costs while reducing brightness unevenness in a displayed image. Note that the effects described here are not necessarily limitative, and any of the effects described in the present disclosure may be provided.

MODE(S) FOR CARRYING OUT THE INVENTION

Figure 1:
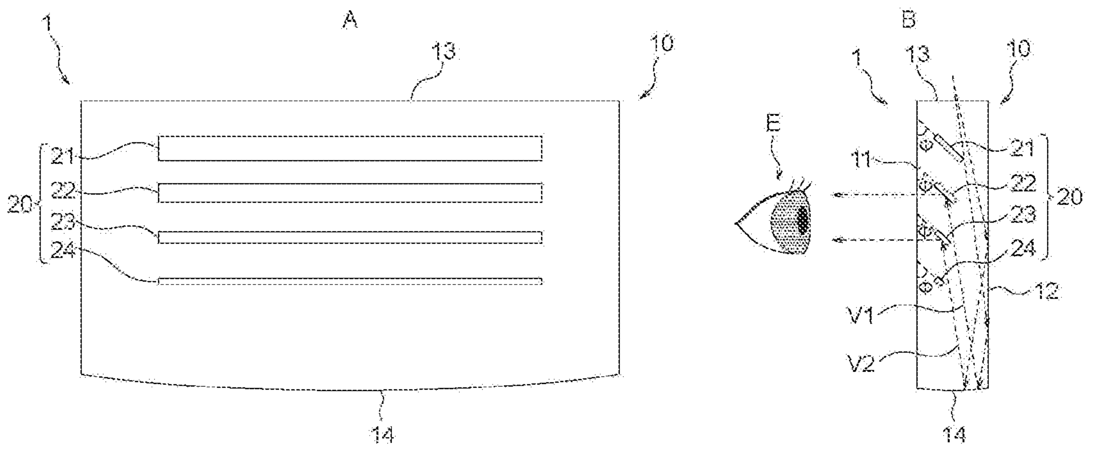
FIG. 1 schematically illustrates a configuration of a light guiding plate 1 according to an embodiment of the present technology.

Favorable embodiments for carrying out the present technology will now be described below with reference to the drawings. Note that the embodiments described below are examples of representative embodiments of the present technology, and the scope of the present technology is not construed as being limited to the embodiments. Further, in the present technology, some of the embodiments and modifications described below may be used in combination.

When the embodiments are described below, configurations may be described using wording including "substantially", such as "substantially parallel" or "substantially orthogonal". For example, a state of being substantially parallel refers to not only a state of being completely parallel, but also a state of being virtually parallel. In other words, it also means that the state of being substantially parallel includes a state varying by, for example, about a few percent from the state of being completely parallel. The same applies to other wording including "substantially". Further, the figures are schematic diagrams, and illustrations are not necessarily precise.

In the drawings, "upper" refers to an upward direction or an upper side in the figures, "lower" refers to a downward direction or a lower side in the figures, "left" refers to a left direction or a left side in the figures, and "right" refers to a right direction or a right side in the figures, unless otherwise specified. Further, in the figures, similar or equivalent elements or members are denoted by a similar reference numeral to omit a repetitive description.

The description is made in the following order.

1. First Embodiment (First Example of Light Guiding Plate)
2. Second Embodiment (Second Example of Light Guiding Plate)
3. Third Embodiment (Third Example of Light Guiding Plate)
4. Fourth Embodiment (Fourth Example of Light Guiding Plate)
5. Fifth Embodiment (Fifth Example of Light Guiding Plate)
6. Sixth Embodiment (Sixth Example of Light Guiding Plate)

7. Seventh Embodiment (Example of Image Display Apparatus)
8. Eighth Embodiment (Example of Method for Manufacturing Light Guiding Plate)

1. First Embodiment (First Example of Light Guiding Plate)

(1) Overview

A light guiding plate according to an embodiment of the present technology is arranged in front of an eye of a viewer to project video light onto the eye of the viewer. The light guiding plate can be included in a head-mounted display (HMD) that is worn on a head of a user. Alternatively, the light guiding plate may be arranged at a specified location as infrastructure.

The light guiding plate includes a transparent member that is formed of a transparent material; a plurality of reflectors arranged inside of the transparent member, each of the plurality of reflectors projecting video light onto an eye of a viewer; and a projection optical system. The transparent member includes a light entering portion from which the video light enters the transparent member, a first surface that is arranged on a side of the viewer, and a second surface that faces the first surface and at which the video light entering the transparent member from the light entering portion is reflected. The projection optical system causes the video light reflected at the second surface to be reflected onto a corresponding one of the plurality of reflectors. The reflectors of the plurality of reflectors are arranged side by side in a direction in which the video light enters the transparent member, each of the plurality of reflectors being inclined at a specified angle with respect to the first surface. The area of the reflector and/or spacing between the reflectors is changed according to a distance from the projection optical system, the area is larger at a larger distance from the projection optical system, and the spacing is smaller at a larger distance from the projection optical system.

The light guiding plate according to the embodiment of the present technology is described with reference to FIG. 1. FIG. 1 schematically illustrates a configuration of a light guiding plate 1 according to an embodiment of the present technology. A of FIG. 1 is a schematic front view illustrating a configuration of the light guiding plate 1 according to the embodiment of the present technology. B of FIG. 1 is a schematic side view illustrating the configuration of the light guiding plate 1 according to the embodiment of the present technology.

As illustrated in FIG. 1, the light guiding plate 1 according to the embodiment of the present technology includes a transparent member 10 that is formed of a transparent material; a plurality of reflectors arranged inside of the transparent member 10, each of the plurality of reflectors projecting video light V1, V2 to an eye E of a viewer; and a projection optical system 14.

The transparent member 10 may be formed of, for example, transparent or semitransparent plastic, glass, or resin. The transparent member 10 includes a light entering portion 13 from which the video light V1,V2 enters the transparent member 10, a first surface 11, and a second surface 12. The first surface 11 is arranged on a side of the viewer. The second surface 12 is arranged to face the first surface 11, and the video light entering the transparent member 10 from the light entering portion 13 is reflected at the second surface 12.

The projection optical system 14 is arranged to face the light entering portion 13, and causes the video light V1, V2 reflected at the second surface 12 to be reflected onto a corresponding one of the plurality of reflectors 20. The projection optical system 14 can be arranged inside of or outside of the transparent member 10.

The reflectors 20 are arranged side by side in a direction in which the video light V1, V2 enters the transparent member 10. In the present embodiment, the video light V1, V2 enters downward from above. Thus, the direction in which the video light V1, V2 enters the transparent member 10 is an up-and-down direction. Note that the figure illustrates four reflectors 20 (a first reflector 21, a second reflector 22, a third reflector 23, and a fourth reflector 24) as examples. However, the number of reflectors 20 is not particularly limited.

Each reflector 20 is inclined at a specified angle with respect to the first surface 11. This enables the viewer to view, through a space between the reflectors 20, an outside world situated across the light guiding plate.

First video light V1 entering the transparent member 10 from the light entering portion 13 is reflected via the second surface 12, the projection optical system 14, and the second reflector 22 in this order to be projected onto the eye E of the viewer. Second video light V2 for an angle of view that is the same as an angle of view corresponding to the first video light V1 is reflected via the second surface 12, the projection optical system 14, and the third reflector 23 in this order to be projected onto the eye E of the viewer.

Note that, in the present embodiment, the video light entering from above is reflected to be converted into parallel light in order to make an apparatus smaller in size. However, parallel video light may be projected from below.

(2) Reflector

The area of each reflector 20 is changed according to a distance from the projection optical system 14. The area is larger if the distance is larger. The reason for this is described. An amount of video light that reaches the first reflector 21 situated at a largest distance from the projection optical system 14 may be attenuated by being blocked by the reflectors 22 to 24 respectively situated at shorter distances from the projection optical system 14 than the first reflector 21. However, the first reflector 21 has a larger area than the reflectors 22 to 24 respectively situated at shorter distances from the projection optical system 14 than the first reflector 21. Thus, an amount of video light reflected off the first reflector 21 is substantially the same as an amount of video light reflected off each of other reflectors that are the reflectors 22 to 24. Likewise, an amount of video light that reaches the second reflector 22 situated at a second-largest distance from the projection optical system 14 may be attenuated by being blocked by the reflectors 23 and 24 respectively situated at shorter distances from the projection optical system 14 than the second reflector 22. However, the second reflector 22 has a larger area than the reflectors 23 and 24 respectively situated at shorter distances from the projection optical system 14 than the second reflector 22. Thus, the amount of video light reflected off the second reflector 22 is substantially the same as the amount of video light reflected off each of other reflectors that are the reflectors 23 and 24. Likewise, the reflector 23,24 has a smaller area if the reflector 23,24 is situated at a smaller distance from the projection optical system 14.

Note that, in the present embodiment, the reflectors 20 may be spaced substantially equally. The spacing between the reflectors 20 refers to a length of a straight line, in an up-and-down direction, that connects central axes of the reflectors 20 that extend in a right-and-left direction.

It is favorable that the reflectors 20 be inclined at substantially the same angle with respect to the first surface 11. In the present embodiment, each reflector 20 is inclined at an angle Φ. This makes it possible to prevent pieces of video light reflected off the respective reflectors 20 from being mixed with each other.

It is favorable that the reflectors 20 have substantially the same optical characteristics. Consequently, amounts of pieces of video light respectively reflected off the reflectors 20 are substantially the same as each other. This results in a reduction in brightness unevenness. Examples of the optical characteristics include the reflectance, the transmittance, the absorptance, and a degree of brilliance.

It is favorable that the reflector 20 include a thin metallic film or a dielectric multilayer. The thin metallic film or the dielectric multilayer is arranged on its surface off which video light is reflected. This makes it possible to easily obtain a high reflectance. Each reflector 20 can project sufficiently bright video light onto the eye E of the viewer if a light source section projects a small amount of light. The viewer can see a video clearly not only indoors but also in sunlight. Further, the reflector 20 can be manufactured at low costs by vacuum deposition performed by a vacuum deposition apparatus. Note that examples of the metal include aluminum, chromium, silver, and gold.

It is favorable that one of surfaces of the reflector 20 exhibit a lower reflectance (a higher absorptance) than another of the surfaces. In other words, it is favorable that a surface situated opposite to the surface off which video light is reflected exhibit a lower reflectance than the surface off which video light is reflected. This makes it possible to prevent video light entering the transparent member 10 from the light entering portion 13 to be directly headed for a corresponding reflector 20 from being reflected off the corresponding reflector 20. Consequently, the occurrence of stray light can be prevented.

Figure 2:
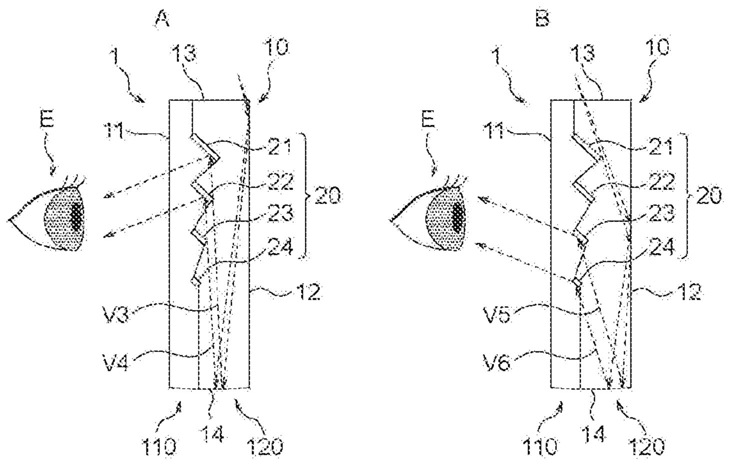
FIG. 2 is a schematic side view illustrating a configuration of the light guiding plate 1 according to the embodiment of the present technology.

Each reflector 20 is arranged at a position dependent on an angle of view for video light. This is described with reference to FIG. 2. FIG. 2 is a schematic side view illustrating a configuration of the light guiding plate 1 according to the embodiment of the present technology. As illustrated in A of FIG. 2, third video light V3 and fourth video light V4, from among the video light, that form an angle of view in an upper portion of a video are reflected via an upper portion of the second surface 12 and a portion of the projection optical system 14 that is situated close to a viewer in this order, and are reflected off the first reflector 21 and the second reflector 22 to be projected onto the eye E of the viewer. As illustrated in B of FIG. 2, fifth video light V5 and sixth video light V6, from among the video light, that form an angle of view in a lower portion of the video are reflected via a lower portion of the second surface 12 and a portion of the projection optical system 14 that is situated away from the viewer in this order, and are reflected off the third reflector 23 and the fourth reflector 24 to be projected onto the eye E of the viewer. As described above, each reflector 20 is arranged at a position dependent on the angle of view for video light. This enables a viewer to view a video at a wide angle of view across the entirety of the field of view.

As described above, amounts of pieces of video light respectively reflected off the reflectors 20 are substantially the same as each other. Thus, pieces of video light of which respective amounts are substantially the same as each other are projected onto the eye E of the viewer regardless of the angle of view for video light. This results in a reduction in brightness unevenness.

Figure 3:
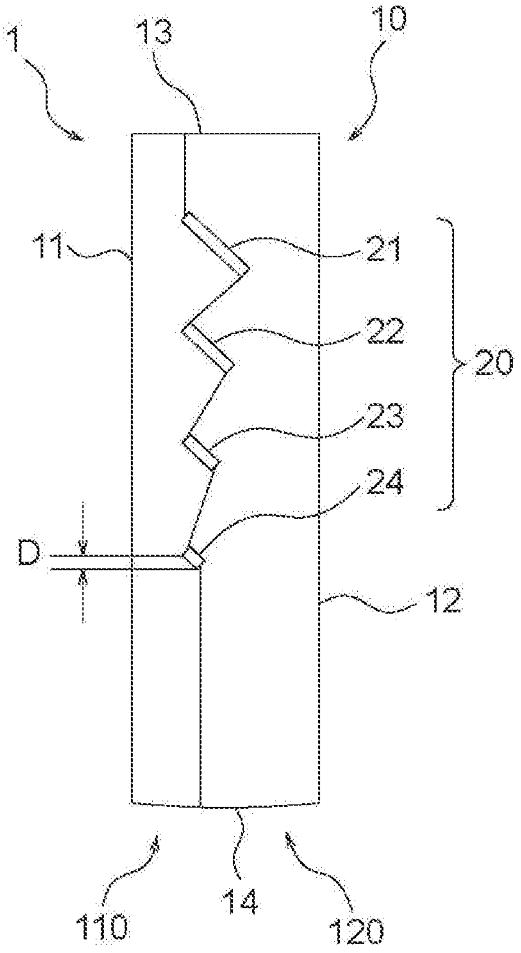
FIG. 3 is a schematic side view illustrating a configuration of the light guiding plate 1 according to the embodiment of the present technology.

It is favorable that each reflector 20 have a width greater than or equal to 0.7 mm in the up-and-down direction as viewed from the viewer. This is described with reference to FIGS. 3 and 4. FIG. 3 is a schematic side view illustrating a configuration of the light guiding plate 1 according to the embodiment of the present technology. For example, D is a width of the fourth reflector 24 in the up-and-down direction as viewed from the viewer, as illustrated in FIG. 3.

Figure 4:
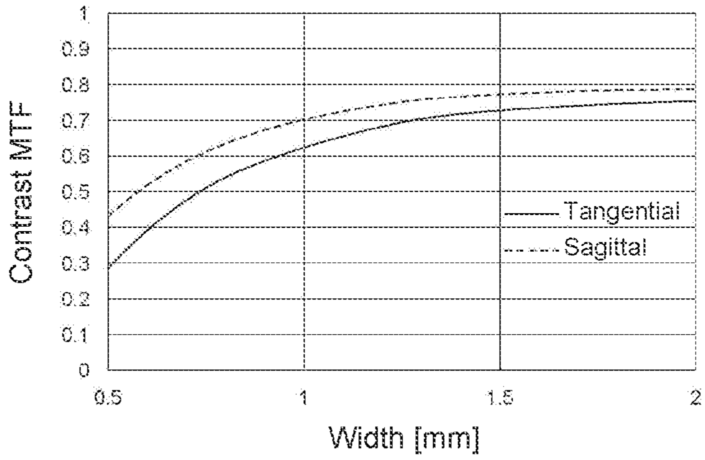
FIG. 4 is a graph on which a result of simulation with respect to the light guiding plate 1 according to the embodiment of the present technology is given.

FIG. 4 is a graph on which a result of simulation with respect to the light guiding plate 1 according to the embodiment of the present technology is given. In FIG. 4, a horizontal axis represents the width D of the reflector in the up-and-down direction as viewed from the viewer. A vertical axis represents a contrast MTF (the resolution) when a spatial frequency is 10 [cycle/degree]. How the contrast MTF varies is plotted for each of a tangential direction and a sagittal direction. When the width D of the reflector is greater than or equal to 1.5 mm, the contrast MTF exhibits a value asymptotically reaching a certain limit value, as illustrated in FIG. 4. On the other hand, the value of the contrast MTF is rapidly decreased as the width D of the reflector becomes smaller. It is favorable that, on the assumption that an acceptable value for the contrast MTF is 70% of a diffraction limit value, the width D of the reflector be greater than or equal to 0.7 mm. When the width D of the reflector is greater than or equal to 0.7 mm, this results in a reduction in an impact due to diffraction. Consequently, a reduction in the resolution of a video formed on a retina of an eye of a viewer can be prevented when video light is projected onto the retina.

(3) Projection Optical System

It is favorable that the projection optical system 14 include a concave reflective film on its surface off which video light is reflected. When the reflective film is concave, pieces of video light respectively reflected at the second surface 12 at various angles are converted into pieces of substantially parallel video light by the projection optical system 14. This results in parallel video light being appropriately reflected onto the reflector 20 dependent on the angle of view for the video light.

The projection optical system 14 can be formed by a reflective film being vacuum-deposited by a vacuum deposition apparatus. Examples of the reflective film include a thin metallic film and a dielectric multilayer.

(4) Transparent Member

The transparent member 10 is formed of a material having a refractive index. Since the transparent member 10 has a refractive index, video light entering the transparent member 10 at an angle greater than a specified angle is totally internally reflected at the second surface 12 within the transparent member 10. There is no need for a member used to cause video light to be reflected at the second surface 12.

In particular, video light entering the transparent member 10 from the light entering portion 13 is totally internally reflected only once at the second surface 12 within the transparent member 10. If light is totally internally reflected multiple times within the transparent member 10, the light will be affected by a reflective surface every time the light undergoes total internal reflection. Thus, there is a need to manufacture the reflective surface with a high degree of accuracy. This results in an increase in manufacturing costs. On the other hand, in the present embodiment, total internal reflection is performed only once. Thus, there is no need for a high surface accuracy with respect to the second surface 12, and there is no need for a high degree of parallelism of the first surface 11 and the second surface 12. This results in a reduction in manufacturing costs.

For example, a thermoplastic resin is used for the transparent member 10. Thus, the transparent member 10 can be manufactured at low costs by, for example, injection molding. In particular, it is favorable that the transparent member 10 include plastic. Examples of plastic include a cyclic polyolefin resin, a cycloolefin copolymer, a polycarbonate resin, an acrylic resin, and an optical polyester resin. Accordingly, the transparent member 10 can be manufactured at low costs by, for example, injection molding. Further, the transparent member 10 can be made lighter in weight.

The light guiding plate according to the first embodiment of the present technology has been described above. Unless there is a technical inconsistency in particular, contents of the description above can be applied to the other embodiments of the present technology.

2. Second Embodiment (Second Example of Light Guiding Plate)

A light guiding plate according to an embodiment of the present technology includes a transparent member. The transparent member includes at least two facing members, and the reflector is arranged between the facing members.

Figure 5:
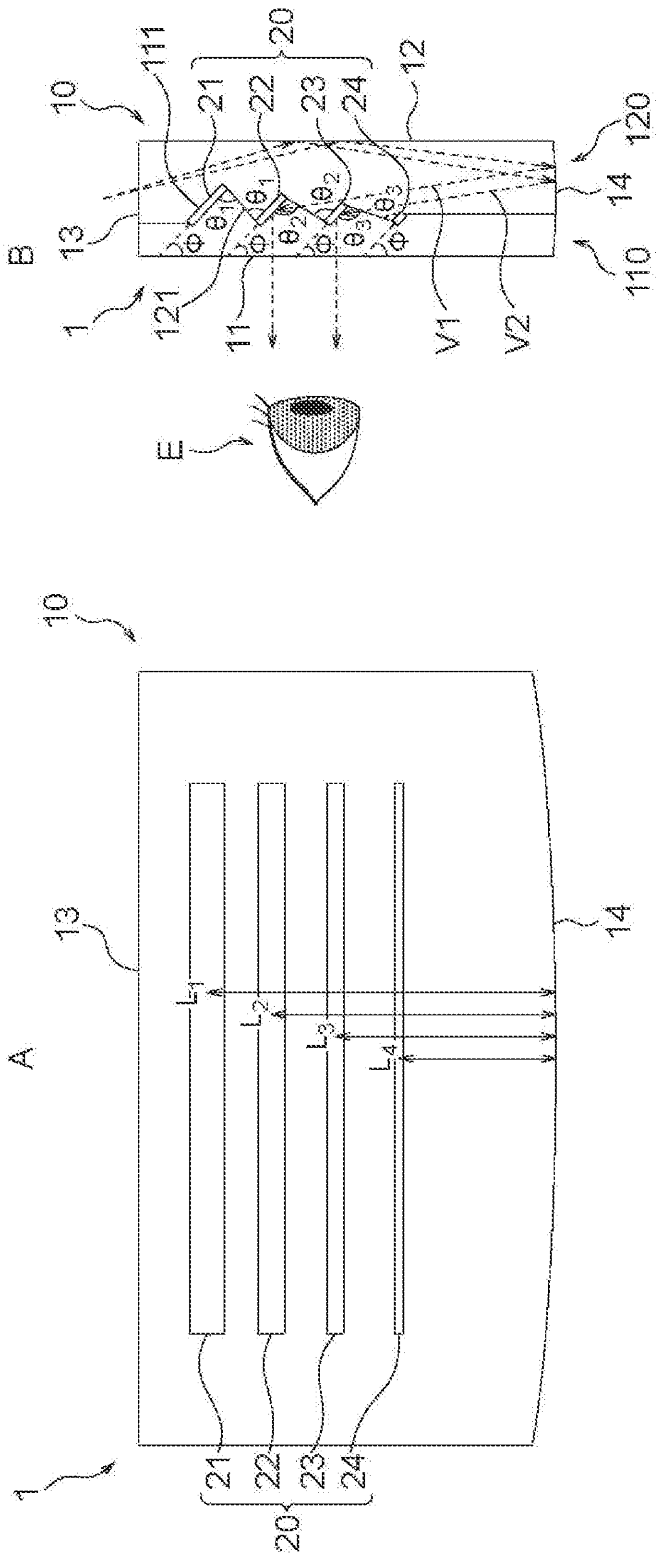
FIG. 5 schematically illustrates a configuration of the light guiding plate 1 according to an embodiment of the present technology.

The light guiding plate according to the embodiment of the present technology is described with reference to FIG. 5. FIG. 5 schematically illustrates a configuration of the light guiding plate 1 according to an embodiment of the present technology. A of FIG. 5 is a schematic front view illustrating the configuration of the light guiding plate 1 according to the embodiment of the present technology. B of FIG. 5 is a schematic side view illustrating the configuration of the light guiding plate 1 according to the embodiment of the present technology.

As illustrated in FIG. 5, the light guiding plate 1 according to the embodiment of the present technology includes the transparent member 10 formed of a transparent material. The transparent member 10 includes a first member 110 and a second member 120 that face each other. The first member 110 is arranged close to a viewer. The second member 120 is arranged away from the viewer. Note that the number of members is not limited to two.

The first member 110 includes a first engagement portion 111 that faces the first surface 11, the first engagement portion 111 including a plurality of convex portions to be formed into a saw-tooth-roof shape. The second member 120 includes a second engagement portion 121 that faces the second surface 12, the second engagement portion 121 being engaged with the first engagement portion 111.

The reflector 20 is provided to the first engagement portion 111 or the second engagement portion 121. Each reflector 20 is inclined at an angle Φ. This makes it possible to prevent pieces of video light reflected off the respective reflectors 20 from being mixed with each other.

A convex portion included in a plurality of the convex portions and situated at a larger distance from the projection optical system 14 has a smaller apex angle, the plurality of convex portions being included in each of the first engagement portion 111 and the second engagement portion 121. In the second engagement portion 121, an apex angle θ2 of the convex portion in which the third reflector 23 is arranged is smaller than an apex angle θ3 of the convex portion in which the fourth reflector 24 is arranged. In the second engagement portion 121, an apex angle θ1 of the convex portion in which the second reflector 22 is arranged is smaller than the apex angle θ2 of the convex portion in which the third reflector 23 is arranged.

In the first engagement portion 111, an apex angle θ2 of the convex portion in which the second reflector 22 is arranged is smaller than an apex angle θ3 of the convex portion in which the third reflector 23 is arranged. In the first engagement portion 111, an apex angle θ1 of the convex portion in which the first reflector 21 is arranged is smaller than the apex angle θ2 of the convex portion in which the second reflector 22 is arranged.

According to such a configuration, the area of the reflector 20 is changed according to a distance from the projection optical system 14. The distance refers to a length of a straight line, in the up-and-down direction, that connects a central axis of each reflector 20 that extends in a right-and-left direction, and the projection optical system 14. $L_4$ represents a distance from the projection optical system 14 to the fourth reflector 24, $L_3$ represents a distance from the projection optical system 14 to the third reflector 23, $L_2$ represents a distance from the projection optical system 14 to the second reflector 22, and $L_1$ represents a distance from the projection optical system 14 to the first reflector 21. The distance is larger in order of $L_1$, $L_2$, $L_3$, and $L_4$. The reflector 20 situated at a larger distance from the projection optical system 14 has a larger area.

The light guiding plate according to the second embodiment of the present technology has been described above. Unless there is a technical inconsistency in particular, contents of the description above can be applied to the other embodiments of the present technology.

3. Third Embodiment (Third Example of Light Guiding Plate)

Figure 6:
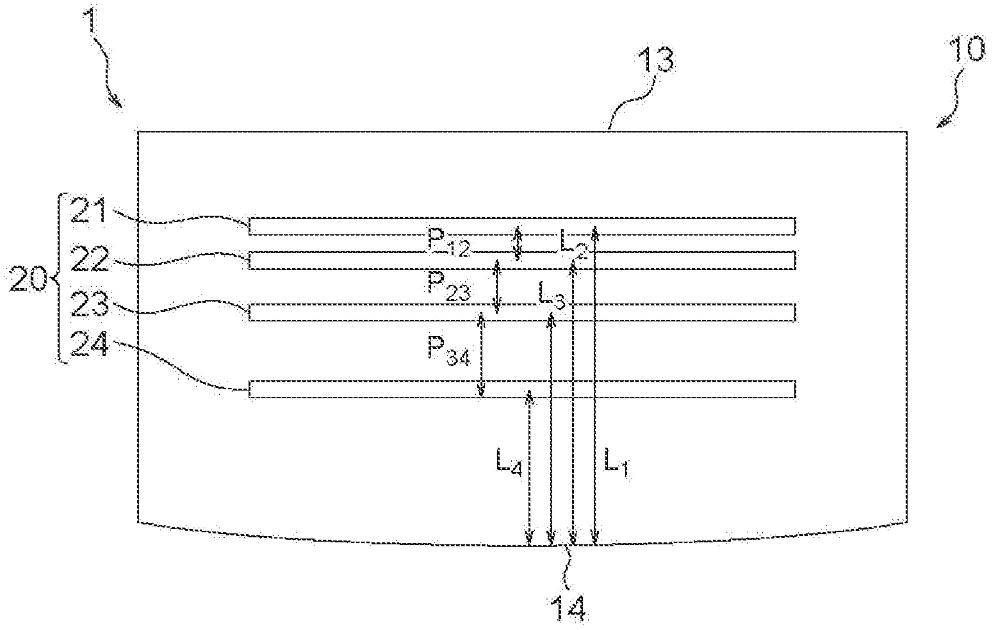
FIG. 6 is a schematic front view illustrating a configuration of the light guiding plate 1 according to an embodiment of the present technology.

Spacing between the reflectors may be changed according to a distance from the projection optical system, and the spacing may be smaller if the distance is larger. This is described with reference to FIG. 6. FIG. 6 is a schematic front view illustrating a configuration of the light guiding plate 1 according to an embodiment of the present technology.

As illustrated in FIG. 6, spacing between the reflectors 20 included in the light guiding plate 1 according to the embodiment of the present technology is changed according to a distance from the projection optical system 14. The spacing is smaller if the distance is larger. $P_{12}$ represents spacing between the first reflector 21 and the second reflector 22, $P_{23}$ represents spacing between the second reflector 22 and the third reflector 23, and $P_{34}$ represents spacing between the third reflector 23 and the fourth reflector 24. The spacing is smaller in order of $P_{12}$, $P_{23}$, and $P_{34}$.

The reason for this is described. An amount of video light that reaches the first reflector 21 situated at a largest distance from the projection optical system 14 may be attenuated by being blocked by the reflectors 22 to 24 respectively situated at shorter distances from the projection optical system 14 than the first reflector 21. However, the spacing $P_{12}$ between the first reflector 21 and the second reflector 22 is smaller than the spacing $P_{23}$ and the spacing $P_{34}$. Thus, an amount of video light reflected off the first reflector 21 is substantially the same as an amount of video light reflected off each of other reflectors that are the reflectors 22 to 24. Likewise, an amount of video light that reaches the second reflector 22 situated at a second-largest distance from the projection optical system 14 may be attenuated by being blocked by the reflectors 23 and 24 respectively situated at shorter distances from the projection optical system 14 than the second reflector 22. However, the spacing $P_{23}$ between the second reflector 22 and the third reflector 23 is smaller than the spacing $P_{34}$. Thus, the amount of video light reflected off the second reflector 22 is substantially the same as the amount of video light reflected off each of other reflectors that are the reflectors 23 and 24. Likewise, spacing between the reflectors is larger at a smaller distance from the projection optical system 14.

As described above, amounts of pieces of video light respectively reflected off the reflectors 20 are substantially the same as each other. Thus, pieces of video light of which respective amounts are substantially the same as each other are projected onto the eye E of the viewer regardless of the angle of view for video light. This results in a reduction in brightness unevenness.

Note that, in the present embodiment, the reflectors 20 may have substantially the same area.

The light guiding plate according to the third embodiment of the present technology has been described above. Unless there is a technical inconsistency in particular, contents of the description above can be applied to the other embodiments of the present technology.

4. Fourth Embodiment (Fourth Example of Light Guiding Plate)

Figure 7:
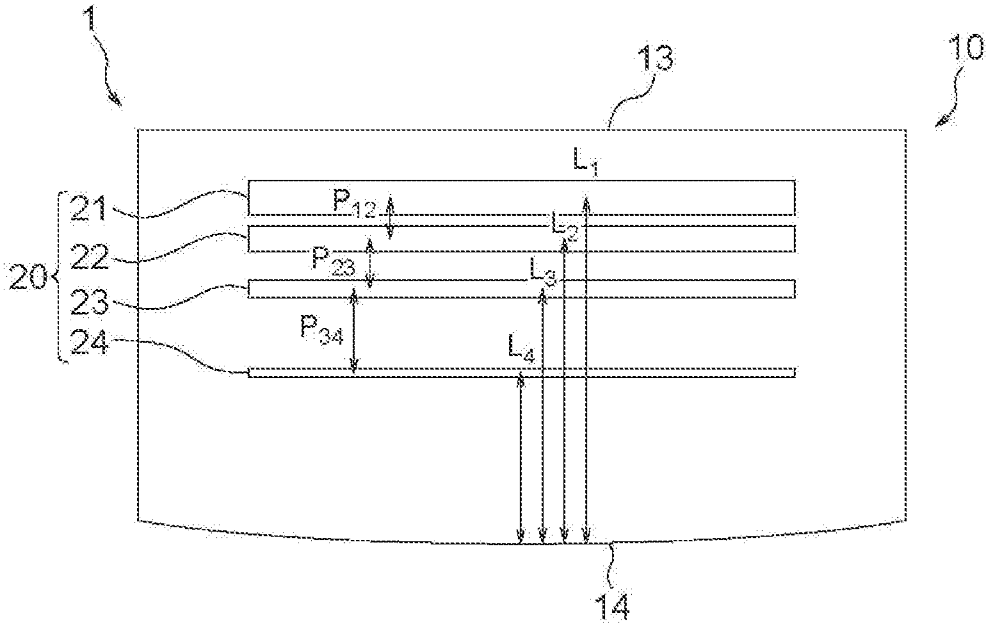
FIG. 7 is a schematic front view illustrating a configuration of the light guiding plate 1 according to an embodiment of the present technology.

The area of the reflector and spacing between the reflectors may be changed according to a distance from the projection optical system, the area may be larger if the distance is larger, and the spacing may be smaller if the distance is larger. This is described with reference to FIG. 7. FIG. 7 is a schematic front view illustrating a configuration of the light guiding plate 1 according to an embodiment of the present technology.

As illustrated in FIG. 7, in the light guiding plate 1 according to the embodiment of the present technology, the reflector 20 situated at a larger distance from the projection optical system 14 has a larger area. The distance is larger in order of $L_1$, $L_2$, $L_3$, and $L_4$. The reflector 20 situated at a larger distance from the projection optical system 14 has a larger area.

Further, spacing between the reflectors 20 is smaller at a larger distance from the projection optical system 14. The spacing is smaller in order of $P_{12}$, $P_{23}$, and $P_{34}$.

Consequently, amounts of pieces of video light respectively reflected off the reflectors 20 are substantially the same as each other. Accordingly, pieces of video light of which respective amounts are substantially the same as each other are projected onto the eye E of the viewer regardless of the angle of view for video light. This results in a reduction in brightness unevenness.

The light guiding plate according to the fourth embodiment of the present technology has been described above. Unless there is a technical inconsistency in particular, contents of the description above can be applied to the other embodiments of the present technology.

5. Fifth Embodiment (Fifth Example of Light Guiding Plate)

Each reflector 20 may include a gaseous layer. The gaseous layer may be, for example, an air layer or a nitrogen layer. The gaseous layer has a low refractive index. Thus, video light is totally internally reflected within the transparent member 10 at an interface between the gaseous layer and the transparent member 10. This results in there being no need for a member such as a metallic film that is used to cause video light to be reflected. Thus, the light guiding plate 1 can be made lighter in weight.

The light guiding plate according to the fifth embodiment of the present technology has been described above. Unless there is a technical inconsistency in particular, contents of the description above can be applied to the other embodiments of the present technology.

6. Sixth Embodiment (Sixth Example of Light Guiding Plate)

Figure 8:
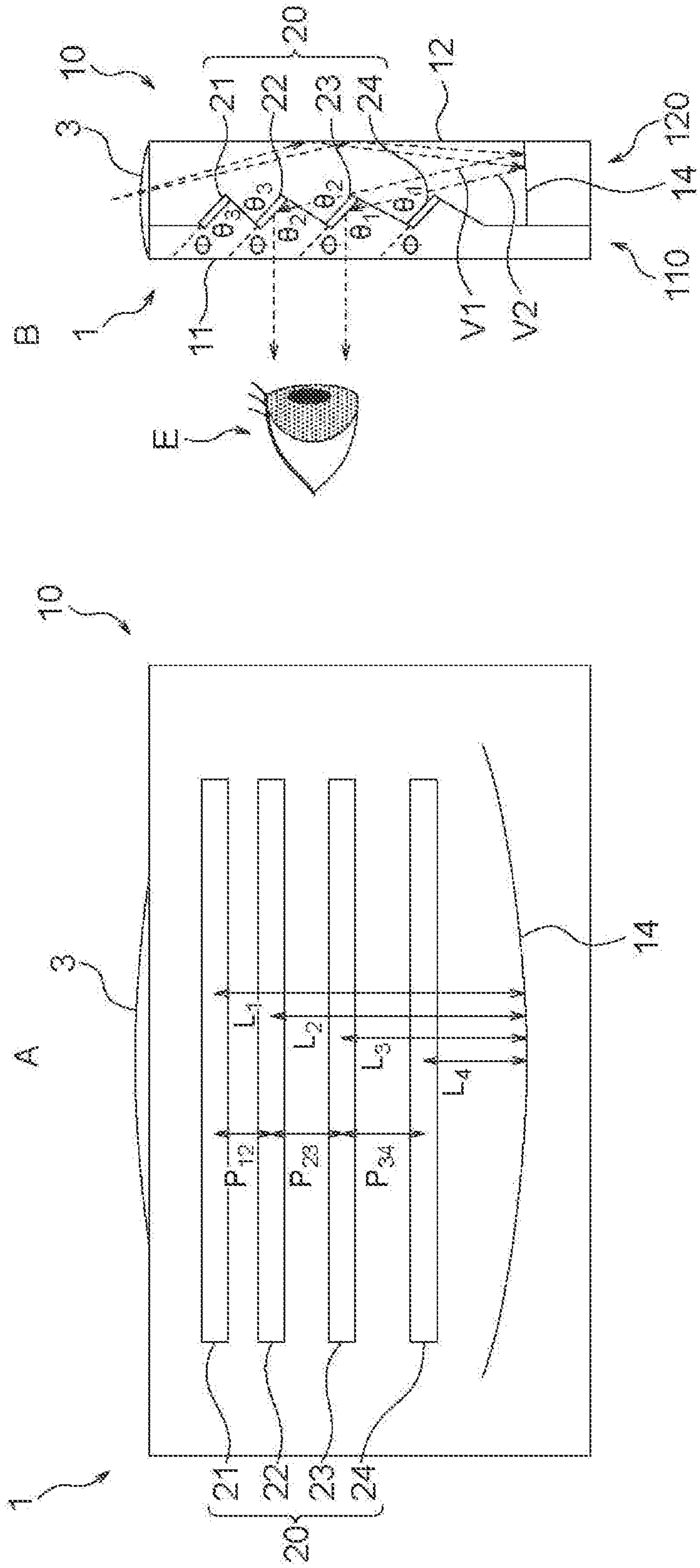
FIG. 8 schematically illustrates a configuration of the light guiding plate 1 according to an embodiment of the present technology.

The light guiding plate according to an embodiment of the present technology may further include a convex lens, and the convex lens may be arranged on an optical axis corresponding to video light that enters the transparent member from the light entering portion. This is described with reference to FIG. 8. FIG. 8 schematically illustrates a configuration of the light guiding plate 1 according to an embodiment of the present technology. A of FIG. 8 is a schematic front view illustrating the configuration of the light guiding plate 1 according to the embodiment of the present technology. B of FIG. 8 is a schematic side view illustrating the configuration of the light guiding plate 1 according to the embodiment of the present technology.

As illustrated in FIG. 8, the light guiding plate 1 according to the embodiment of the present technology may further include a convex lens 3. The convex lens 3 is arranged on an optical axis corresponding to video light that enters the transparent member 10 from the light entering portion 13. Consequently, a video formed on a retina by the video light being projected onto the eye E of the viewer becomes clearer. The convex lens 3 and a projection optical system including a concave reflective film 14 make it possible to further correct for aberrations.

The light guiding plate according to the sixth embodiment of the present technology has been described above. Unless there is a technical inconsistency in particular, contents of the description above can be applied to the other embodiments of the present technology.

7. Seventh Embodiment (Example of Image Display Apparatus)

Figure 9:
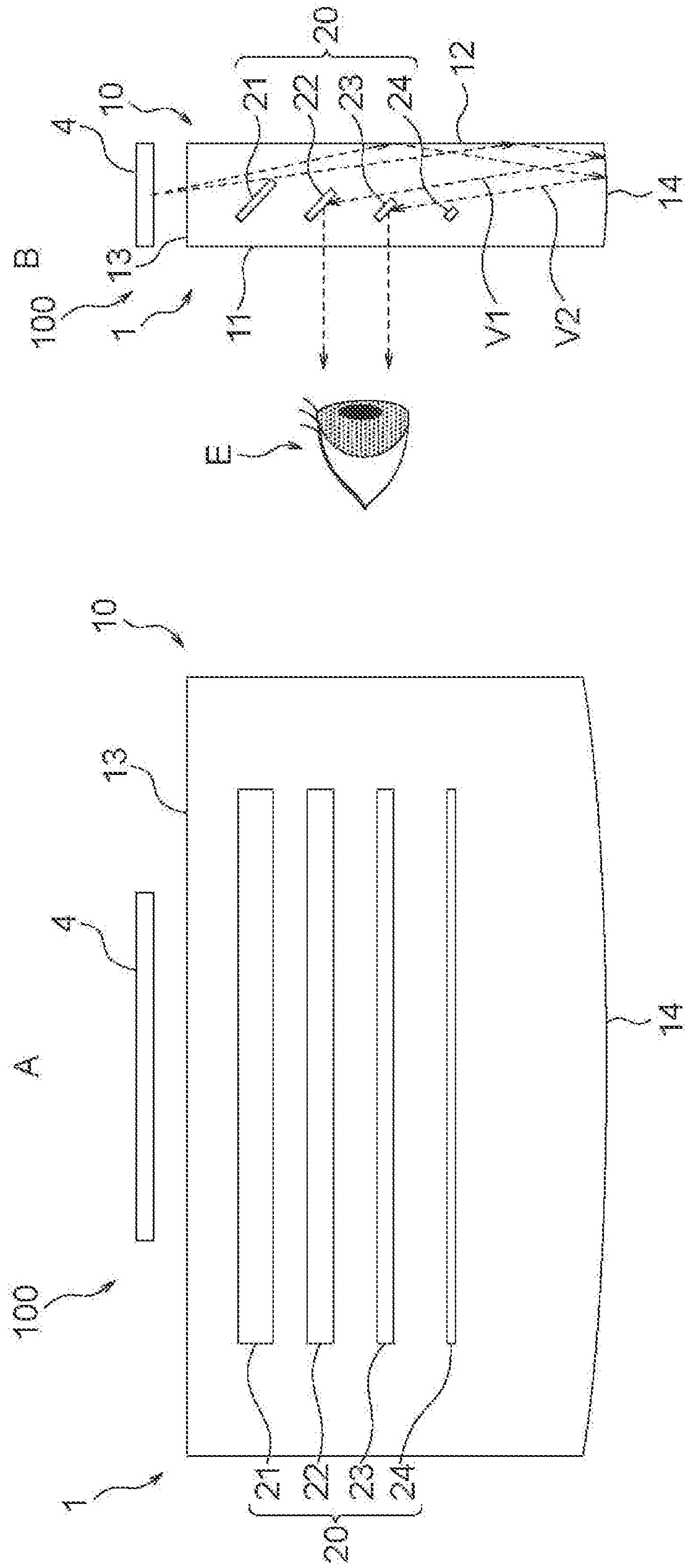
FIG. 9 schematically illustrates a configuration of an image display apparatus 100 according to an embodiment of the present technology.

An image display apparatus according to an embodiment of the present technology includes a video display section that projects video light, and the light guiding plate according to one of the other embodiments described above. The image display apparatus according to the embodiment of the present technology is described with reference to FIG. 9. FIG. 9 schematically illustrates a configuration of an image display apparatus 100 according to an embodiment of the present technology. A of FIG. 9 is a schematic front view illustrating the configuration of the image display apparatus 100 according to the embodiment of the present technology. B of FIG. 9 is a schematic side view illustrating the configuration of the image display apparatus 100 according to the embodiment of the present technology.

As illustrated in FIG. 9, the image display apparatus 100 according to the embodiment of the present technology includes a video display section 4 that projects video light, and the light guiding plate 1 according to one of the other embodiments described above.

The video display section 4 converts video data into video light, and projects the video light. Video light V1,V2 projected by the video display section 4 enters the transparent member 10 from the light entering portion 13, and is reflected via the second surface 12, the projection optical system 14, and the second reflector 22 in this order to be projected onto the eye E of the viewer.

It is favorable that the video display section 4 include a self-luminous element. This makes it possible to make the video display section 4 smaller in size and lighter in weight, and thus to make the image display apparatus 100 smaller in size and lighter in weight. Further, this results in a reduction in manufacturing costs. Examples of the self-luminous element include an organic EL element and a micro LED element.

The image display apparatus according to the seventh embodiment of the present technology has been described above. Unless there is a technical inconsistency in particular, contents of the description above can be applied to the other embodiments of the present technology.

8. Eighth Embodiment (Example of Method for Manufacturing Light Guiding Plate)

A light-guiding-plate manufacturing method according to an embodiment of the present technology includes forming, into a saw-tooth-roof shape, at least one of surfaces of a transparent member formed of a transparent material, the saw-tooth-roof shape including a plurality of convex portions; forming a reflector on the saw-tooth-roof-shaped surface; and bonding at least the two transparent members such that the saw-tooth-roof-shaped surfaces of the at least the two transparent members face each other. A convex portion of the plurality of convex portions that is situated at a larger distance from one side of the transparent member has a smaller apex angle.

Figure 10:
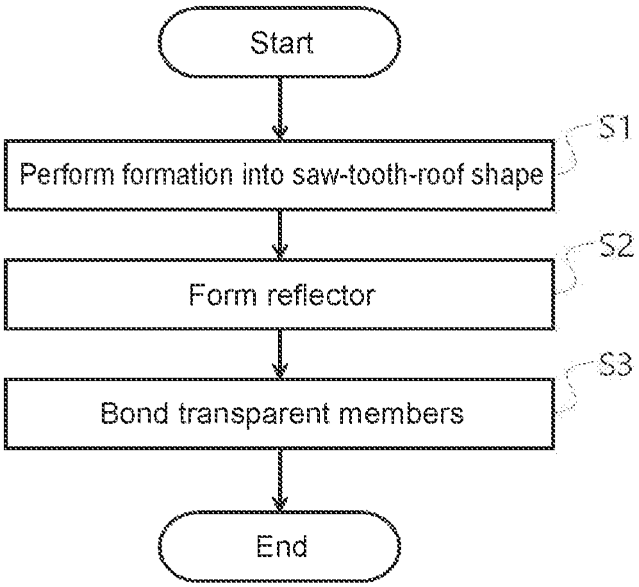
FIG. 10 is a flowchart illustrating an example of a manufacturing method according to an embodiment of the present technology, the manufacturing method being a method for manufacturing the light guiding plate 1.

The light-guiding-plate manufacturing method according to the embodiment of the present technology is described with reference to FIG. 10. FIG. 10 is a flowchart illustrating an example of a manufacturing method according to an embodiment of the present technology, the manufacturing method being a method for manufacturing the light guiding plate 1.

As illustrated in FIG. 10, the light-guiding-plate manufacturing method according to the embodiment of the present technology includes forming, into a saw-tooth-roof shape, at least one of surfaces of a transparent member formed of a transparent material, the saw-tooth-roof shape including a plurality of convex portions (Step S1); forming a reflector on the saw-tooth-roof-shaped surface (Step S2); and bonding at least the two transparent members such that the saw-tooth-roof-shaped surfaces of the at least the two transparent members face each other (Step S3).

A convex portion of the plurality of convex portions that is situated at a larger distance from one side of the transparent member has a smaller apex angle.

The image display apparatus according to the eighth embodiment of the present technology has been described above. Unless there is a technical inconsistency in particular, contents of the description above can be applied to the other embodiments of the present technology.

Note that embodiments according to the present technology are not limited to the embodiments described above, and various modifications may be made thereto without departing from the scope of the present technology.

Further, the present technology may also take the following configurations.

(1) A light guiding plate, including:
- a transparent member that is formed of a transparent material;
- a plurality of reflectors arranged inside of the transparent member, each of the plurality of reflectors projecting video light onto an eye of a viewer; and
- a projection optical system,
- the transparent member including
  - a light entering portion from which the video light enters the transparent member,
  - a first surface that is arranged on a side of the viewer, and
  - a second surface that faces the first surface, the second surface being a surface at which the video light entering the transparent member from the light entering portion is reflected,
- the projection optical system causing each piece of video light reflected at the second surface to be reflected onto a corresponding one of the plurality of reflectors,
- the reflectors of the plurality of reflectors being arranged side by side in a direction in which the video light enters the transparent member, each of the plurality of reflectors being inclined at a specified angle with respect to the first surface, in which
- an area of the reflector and/or spacing between the reflectors is changed according to a distance from the projection optical system,
- the area is larger at a larger distance from the projection optical system, and
- the spacing is smaller at a larger distance from the projection optical system.

(2) The light guiding plate according to (1), in which
- the reflectors of the plurality of reflectors are inclined at substantially the same angle with respect to the first surface.

(3) The light guiding plate according to (1) or (2), in which
- the reflectors of the plurality of reflectors have substantially the same optical characteristics.

(4) The light guiding plate according to any one of (1) to (3), in which
- the reflector includes a thin metallic film or a dielectric multilayer.

(5) The light guiding plate according to any one of (1) to (4), in which
- the reflector is arranged at a position dependent on an angle of view for the video light.

(6) The light guiding plate according to any one of (1) to (5), in which
- the reflector has a width greater than or equal to 0.7 mm in an up-and-down direction as viewed from the viewer.

(7) The light guiding plate according to any one of (1) to (6), in which
- one of surfaces of the reflector exhibits a lower reflectance than another of the surfaces.

(8) The light guiding plate according to any one of (1) to (7), in which
- the reflector includes a gaseous layer.

(9) The light guiding plate according to any one of (1) to (8), in which
- the projection optical system includes a concave reflective film.

(10) The light guiding plate according to any one of (1) to (9), in which the video light is totally internally reflected only once at the second surface within the transparent member.

(11) The light guiding plate according to any one of (1) to (10), in which the transparent member includes plastic.

(12) The light guiding plate according to any one of (1) to (11), in which the transparent member includes at least two members that face each other, and the reflector is arranged between the facing members.

(13) The light guiding plate according to any one of (1) to (12), in which the transparent member includes a first member and a second member that face each other, the first member includes a first engagement portion that faces the first surface, the first engagement portion including a plurality of convex portions to be formed into a saw-tooth-roof shape, the second member includes a second engagement portion that faces the second surface, the second engagement portion being engaged with the first engagement portion, and the reflector is provided to the first engagement portion or the second engagement portion.

(14) The light guiding plate according to (13), in which a convex portion included in a plurality of the convex portions and situated at a larger distance from the projection optical system has a smaller apex angle, the plurality of convex portions being included in each of the first engagement portion and the second engagement portion.

(15) The light guiding plate according to any one of (1) to (14), further including a convex lens that is arranged on an optical axis corresponding to the video light entering the transparent member from the light entering portion.

(16) An image display apparatus, including:

a video display section that projects video light; and the light guiding plate according to any one of (1) to (15).

(17) The image display apparatus according to (16), in which the video display section includes a self-luminous element.

(18) A method for manufacturing a light guiding plate, the method including:

forming, into a saw-tooth-roof shape, at least one of surfaces of a transparent member formed of a transparent material, the saw-tooth-roof shape including a plurality of convex portions;

forming a reflector on the saw-tooth-roof-shaped surface; and bonding at least the two transparent members such that the saw-tooth-roof-shaped surfaces of the at least the two transparent members face each other, in which a convex portion of the plurality of convex portions that is situated at a larger distance from one side of the light guiding plate has a smaller apex angle.

REFERENCE SIGNS LIST

1 light guiding plate
10 transparent member
11 first surface
12 second surface
13 light entering portion
14 projection optical system
20 reflector
21 first reflector
22 second reflector
23 third reflector
24 fourth reflector
110 first member
111 first engagement portion
120 second member
121 second engagement portion
3 convex lens
4 video display section
100 image display apparatus
S1 performing formation into saw-tooth-roof shape
S2 forming reflector
S3 bonding transparent members

What is claimed is:

1. A light guiding plate, comprising:

a transparent member that is formed of a transparent material;

a plurality of reflectors arranged inside of the transparent member, each of the plurality of reflectors projecting video light onto an eye of a viewer; and a projection optical system, the transparent member including a light entering portion from which the video light enters the transparent member, a first surface that is arranged on a side of the viewer, and a second surface that faces the first surface, the second surface being a surface at which the video light entering the transparent member from the light entering portion is reflected, the projection optical system causing each piece of video light reflected at the second surface to be reflected onto a corresponding one of the plurality of reflectors, the reflectors of the plurality of reflectors being arranged side by side in a direction in which the video light enters the transparent member, each reflector of the plurality of reflectors being inclined at a specified angle with respect to the first surface, wherein an area of the reflectors and a spacing between the reflectors is changed according to a distance from the projection optical system, wherein the area of the reflectors is larger at a larger distance from the projection optical system, and wherein the spacing between the reflectors is smaller at a larger distance from the projection optical system.

2. The light guiding plate according to claim 1, wherein the reflectors of the plurality of reflectors are inclined at substantially the same angle with respect to the first surface.

3. The light guiding plate according to claim 1, wherein the reflectors of the plurality of reflectors have substantially the same optical characteristics.

4. The light guiding plate according to claim 1, wherein each reflector of the plurality of reflectors includes a thin metallic film or a dielectric multilayer.

5. The light guiding plate according to claim 1, wherein each reflector of the plurality of reflectors is arranged at a position dependent on an angle of view for the video light.

6. The light guiding plate according to claim 1, wherein each reflector of the plurality of reflectors has a width greater than or equal to 0.7 mm in an up-and-down direction as viewed from the viewer.

7. The light guiding plate according to claim 1, wherein one of surfaces of each reflector of the plurality of reflectors exhibits a lower reflectance than another of the surfaces.

8. The light guiding plate according to claim 1, wherein each reflector of the plurality of reflectors includes a gaseous layer.

9. The light guiding plate according to claim 1, wherein the projection optical system includes a concave reflective film.

10. The light guiding plate according to claim 1, wherein the video light is totally internally reflected only once at the second surface within the transparent member.

11. The light guiding plate according to claim 1, wherein the transparent member includes plastic.

12. The light guiding plate according to claim 1, wherein the transparent member includes at least two members that face each other, and each reflector of the plurality of reflectors is arranged between the facing members.

13. The light guiding plate according to claim 1, wherein the transparent member includes a first member and a second member that face each other, the first member includes a first engagement portion that faces the first surface, the first engagement portion including a plurality of convex portions to be formed into a saw-tooth-roof shape, the second member includes a second engagement portion that faces the second surface, the second engagement portion being engaged with the first engagement portion, and each reflector of the plurality of reflectors is provided to the first engagement portion or the second engagement portion.

14. The light guiding plate according to claim 13, wherein a convex portion included in a plurality of the convex portions and situated at a larger distance from the projection optical system has a smaller apex angle, the plurality of convex portions being included in each of the first engagement portion and the second engagement portion.

15. The light guiding plate according to claim 1, further comprising a convex lens that is arranged on an optical axis corresponding to the video light entering the transparent member from the light entering portion.

16. An image display apparatus, comprising:

a video display section that projects video light; and the light guiding plate according to claim 1.

17. The image display apparatus according to claim 16, wherein the video display section includes a self-luminous element.

18. A method for manufacturing a light guiding plate, the method comprising:

forming, into a saw-tooth-roof shape, at least one surface of a transparent member formed of a transparent material, the saw-tooth-roof shape including a plurality of convex portions;

forming a reflector on the saw-tooth-roof-shaped surface; and bonding at least two transparent members such that the saw-tooth-roof-shaped surfaces of the at least the two transparent members face each other, wherein a convex portion of the plurality of convex portions that is situated at a larger distance from one side of the light guiding plate has a smaller apex angle.

* * * * *